(12) United States Patent
Yang et al.

(10) Patent No.: US 12,519,158 B2
(45) Date of Patent: Jan. 6, 2026

(54) BATTERY PACK AND VEHICLE COMPRISING BATTERY PACK

(71) Applicant: LG ENERGY SOLUTION, LTD., Seoul (KR)

(72) Inventors: Chang-Hyeon Yang, Daejeon (KR); Hae-Jin Kim, Daejeon (KR); Byung-Do Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 477 days.

(21) Appl. No.: 17/922,743

(22) PCT Filed: Dec. 2, 2021

(86) PCT No.: PCT/KR2021/018164
§ 371 (c)(1),
(2) Date: Nov. 1, 2022

(87) PCT Pub. No.: WO2022/124700
PCT Pub. Date: Jun. 16, 2022

(65) Prior Publication Data
US 2023/0170553 A1    Jun. 1, 2023

(30) Foreign Application Priority Data
Dec. 7, 2020    (KR) .................. KR10-2020-0169918

(51) Int. Cl.
 *H01M 10/6568* (2014.01)
 *H01M 10/613* (2014.01)
 *H01M 10/625* (2014.01)

(52) U.S. Cl.
 CPC ..... *H01M 10/6568* (2015.04); *H01M 10/613* (2015.04); *H01M 10/625* (2015.04)

(58) Field of Classification Search
None
See application file for complete search history.

(56) References Cited

U.S. PATENT DOCUMENTS

| | | | |
|---|---|---|---|
| 6,386,593 B1 * | 5/2002 | Slais | F16J 15/0818 277/609 |
| 10,046,665 B2 | 8/2018 | Ishikawa | |

(Continued)

FOREIGN PATENT DOCUMENTS

| | | |
|---|---|---|
| DE | 10 2014 200 174 A1 | 7/2015 |
| EP | 3 522 291 A1 | 8/2019 |

(Continued)

OTHER PUBLICATIONS

Extended European Search Report for European Application No. 21903746.2, dated Nov. 6, 2023.

(Continued)

*Primary Examiner* — Scott J. Chmielecki
(74) *Attorney, Agent, or Firm* — Birch, Stewart, Kolasch & Birch, LLP

(57) ABSTRACT

Discussed is a battery pack, which may include a battery module including a battery cell and having a cooling pipe unit including a coolant flow path for cooling the battery cell, a pack case configured to accommodate the battery module, a coolant inflow and outflow pipe configured to supply a coolant to the coolant flow path and to discharge the coolant from the coolant flow path to an outside of the pack case, a first sealing unit between the coolant inflow and outflow pipe and the pack case, and a second sealing unit between the coolant inflow and outflow pipe and the cooling pipe unit.

12 Claims, 7 Drawing Sheets

(56) References Cited

U.S. PATENT DOCUMENTS

| | | | |
|---|---|---|---|
| 10,601,088 B2 | 3/2020 | Fees et al. | |
| 2012/0001420 A1* | 1/2012 | Ogino | F16J 15/062 |
| | | | 285/348 |
| 2014/0140118 A1* | 5/2014 | Ishikawa | H05K 7/20927 |
| | | | 363/141 |
| 2015/0030902 A1 | 1/2015 | Nagano et al. | |
| 2015/0099146 A1 | 4/2015 | Kim et al. | |
| 2016/0258556 A1 | 9/2016 | Miller et al. | |
| 2017/0066344 A1* | 3/2017 | Ishikawa | B60L 3/003 |
| 2018/0123198 A1* | 5/2018 | Fees | H01M 50/20 |
| 2018/0138561 A1 | 5/2018 | Lee et al. | |
| 2019/0070975 A1* | 3/2019 | Haeusler | H01M 10/6567 |
| 2019/0089026 A1 | 3/2019 | Choi et al. | |
| 2019/0293218 A1* | 9/2019 | Williams | F16L 37/23 |

FOREIGN PATENT DOCUMENTS

| | | |
|---|---|---|
| EP | 3 890 099 A1 | 10/2021 |
| JP | 2015-20685 A | 2/2015 |
| JP | 2017-27962 A | 2/2017 |
| KR | 10-1750029 B1 | 6/2017 |
| KR | 10-2017-0090725 A | 8/2017 |
| KR | 10-2019-0032843 A | 3/2019 |
| KR | 10-1987778 B1 | 6/2019 |
| KR | 10-2002862 B1 | 7/2019 |
| KR | 10-2050531 B1 | 11/2019 |
| KR | 10-2020-0011787 A | 2/2020 |
| KR | 10-2020-0017822 A | 2/2020 |
| KR | 10-2089646 B1 | 3/2020 |
| KR | 10-2020-0041007 A | 4/2020 |
| KR | 10-2020-0061007 A | 6/2020 |
| KR | 10-2020-0107107 A | 9/2020 |
| KR | 10-2020-0118529 A | 10/2020 |

OTHER PUBLICATIONS

International Search Report (PCT/ISA/210) issued in PCT/KR2021/018164 mailed on Mar. 11, 2022.

* cited by examiner

BATTERY PACK AND VEHICLE COMPRISING BATTERY PACK

TECHNICAL FIELD

The present disclosure relates to a battery pack and a vehicle including the battery pack.

The present application claims priority to Korean Patent Application No. 10-2020-0169918 filed on Dec. 7, 2020 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing energy efficiency and environment friendliness in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

A conventional battery pack is generally configured to include a pack case mounted to a vehicle, such as an electric vehicle, and at least one battery module provided inside the pack case. Here, at least one battery module may include a water-cooled cooling pipe unit for cooling the battery cells, and the battery pack may further include has a coolant inflow and outflow pipe mounted through the pack case to supply and discharge a coolant using the cooling pipe unit.

In the conventional battery pack, it is necessary to isolate the cooling water flowing through the water-cooling coolant inflow and outflow pipe and the cooling pipe unit not to come into contact with the battery cells inside the battery pack. That is, it is important to block the risk of the cooling water from flowing to the battery cells inside the battery module.

Therefore, it is required to find a way to implement a tighter watertight structure in a water-cooled battery pack.

DISCLOSURE

Technical Problem

The present disclosure is designed to solve the problems of the related art, and therefore the present disclosure is directed to providing a battery pack, which may implement a tighter watertight structure in a water-cooled battery pack, and a vehicle including the battery pack.

Technical Solution

In one aspect of the present disclosure, there is provided a battery pack that may include: at least one battery module including at least one battery cell and having a cooling pipe unit including a coolant flow path for cooling the at least one battery cell; a pack case configured to accommodate the at least one battery module; a coolant inflow and outflow pipe mounted through the pack case and connected to the cooling pipe unit to supply a coolant to the coolant flow path from an outside of the pack case and to discharge the coolant from the coolant flow path to the outside of the pack case; a first sealing unit between the coolant inflow and outflow pipe and the pack case; and a second sealing unit spaced apart from the first sealing unit by a predetermined distance and between the coolant inflow and outflow pipe and the cooling pipe unit.

The coolant inflow and outflow pipe may include a pipe body provided through the pack case and contacting an outer surface of the pack case; an outer pipe configured to protrude out of the pack case from the pipe body and connected to an external cooling unit; and an inner pipe spaced apart from the outer pipe by a predetermined distance, configured to protrude into the pack case from the pipe body, and connected to the cooling pipe unit.

The first sealing unit may be between the pipe body and the pack case.

The first sealing unit may be to contact the outer surface of the pack case.

The pipe body may include a fastening plate at an outer side of the pack case and fastened with the pack case, and the first sealing unit may be between the fastening plate and the pack case.

The fastening plate may have a first sealing unit insert groove into which the first sealing unit is inserted.

The second sealing unit may be provided in plural, and the plurality of second sealing units may be spaced apart from each other by a predetermined distance along a longitudinal direction of the inner pipe.

The first sealing unit may include a planar O-ring member.

The second sealing unit may include an axial O-ring member.

In addition, the present disclosure also provides a vehicle including at least one battery pack according to the former embodiments.

Advantageous Effects

According to various embodiments as above, it is possible to provide a battery pack, which may implement a tighter watertight structure in a water-cooled battery pack, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
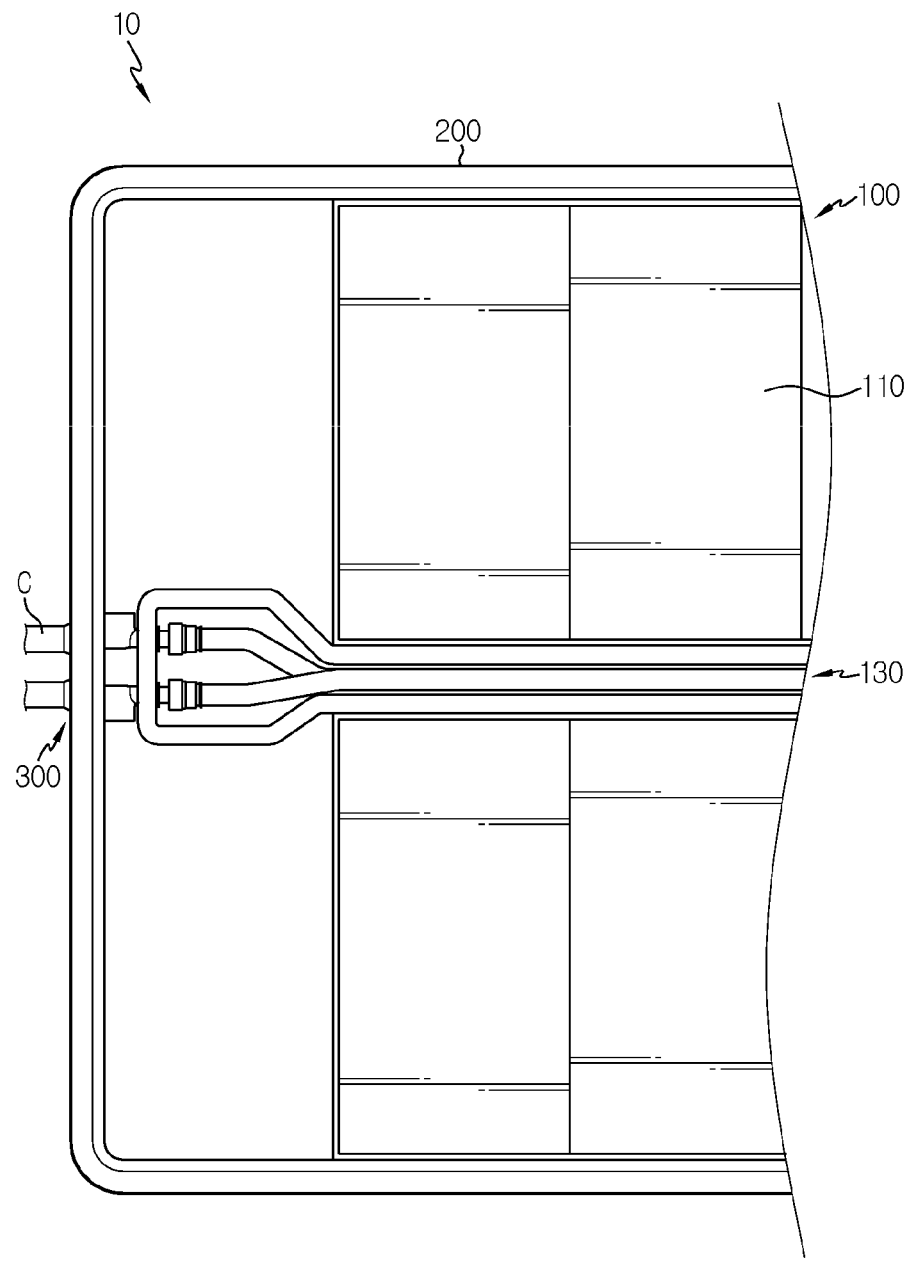
FIG. 1 is a diagram for illustrating a battery pack according to an embodiment of the present disclosure.
Figure 2:
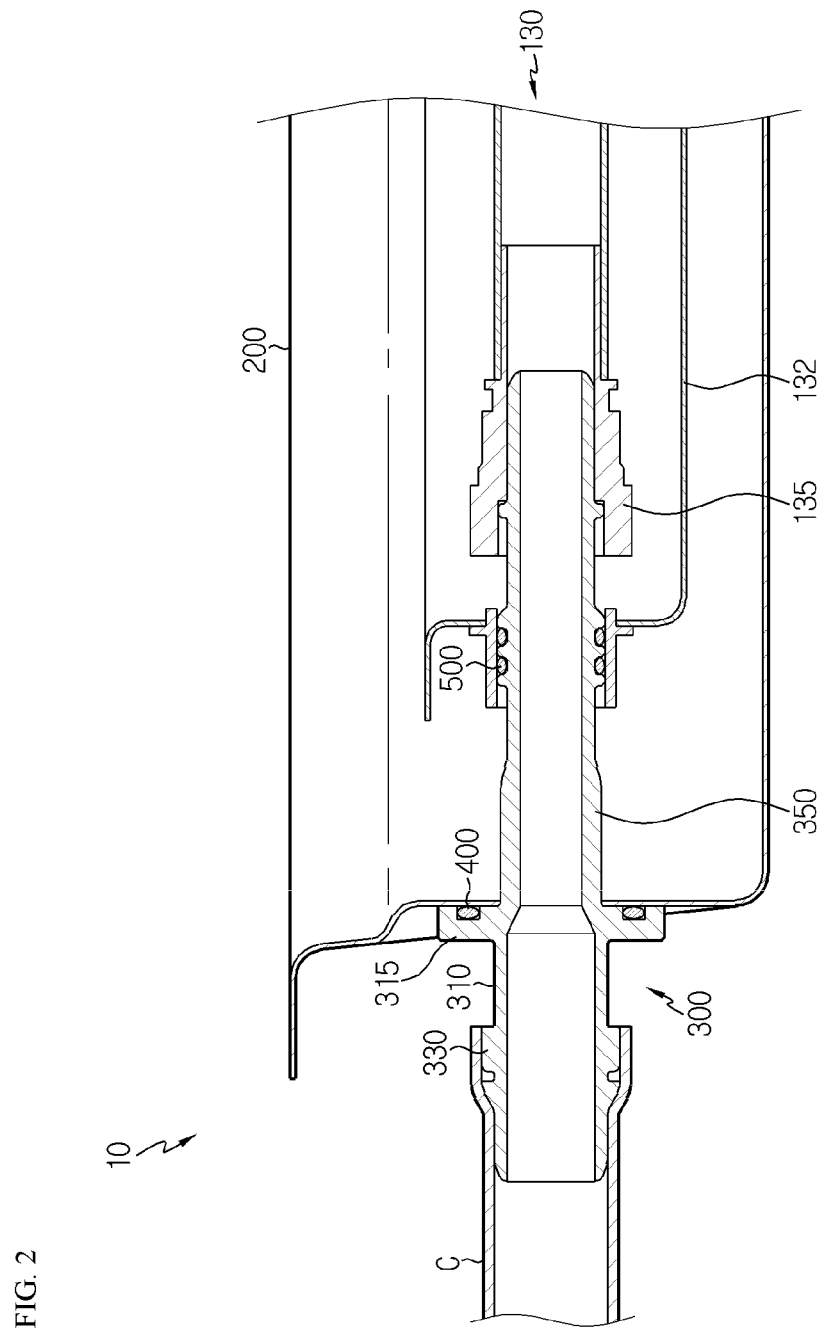
FIG. 2 is a diagram for illustrating a main part of the battery pack of FIG. 1.

FIG. 1 is a diagram for illustrating a battery pack according to an embodiment of the present disclosure, and FIG. 2 is a diagram for illustrating a main part of the battery pack of FIG. 1.

Referring to FIGS. 1 and 2, the battery pack 10 may be provided to a vehicle as a fuel source of the vehicle. For example, the battery pack 10 may be provided to an electric vehicle, a hybrid electric vehicle, a plug-in hybrid vehicle, and various other types of vehicles that may use the battery pack 10 as a fuel source.

Also, the battery pack 10 may be provided to other devices, instruments and facilities, such as an energy storage system, using a battery cell as a secondary battery, in addition to the vehicle.

The battery pack 10 may include a battery module 100, a pack case 200, a coolant inflow and outflow pipe 300, a first sealing unit 400, and a second sealing unit 500.

At least one battery module 100 or a plurality of battery modules 100 may be provided. The battery module 100 may be mounted inside a pack case 200, explained later.

The battery module 100 may include a battery cell 110 and a cooling pipe unit 130.

The battery cell 110 is a secondary battery and may be provided as a pouch-type secondary battery, a cylindrical secondary battery, or a prismatic secondary battery. Hereinafter, in this embodiment, the battery cell 110 will be described as a pouch-type secondary battery.

At least one battery cell 110 or a plurality of battery cells 110 may be provided. Hereinafter, in this embodiment, it will be described that the battery cell 110 is provided in plural so that the plurality of battery cells 110 are stacked on each other to be electrically connected with each other.

The cooling pipe unit 130 is for cooling the at least one battery cell 110, or the plurality of battery cells 110 in this embodiment, and may be connected to an external cooling unit C through a coolant inflow and outflow pipe 300, explained later.

The cooling pipe unit 130 may have a coolant flow path formed for cooling the at least one battery cell 110 or the plurality of battery cells 110. In the coolant flow path, a coolant supplied from the external cooling unit C may flow to be circulated.

The coolant is a water-cooling type and may be provided as a cooling water. The coolant may be supplied through the coolant inflow and outflow pipe 300, explained later, from the external cooling unit C, circulate through the coolant flow path, and be then discharged through the coolant inflow and outflow pipe 300, explained later, to the external cooling unit C again.

The cooling pipe unit 130 may include a pipe housing 132 and a connection pipe 135.

The pipe housing 132 may form an appearance of the cooling pipe unit 130. The pipe housing 132 may be disposed between the plurality of battery cells 110.

The connection pipe 135 is disposed in the pipe housing 132 and may include the coolant flow path. The connection pipe 135 may be connected to the coolant inflow and outflow pipe 300, explained later, inside the pipe housing 132.

The pack case 200 may accommodate the at least one battery module 100. In addition to the battery module 100, the pack case 200 may accommodate various electric components or other components constituting the battery pack 10. The pack case 200 may be mounted to other devices, instruments, and facilities, such as the vehicle, the energy storage system, and the like.

The coolant inflow and outflow pipe 300 is for supplying a coolant from the outside of the pack case 200 to the coolant flow path and discharging the coolant from the coolant flow path to the outside of the pack case 200, and may be mounted through the pack case 200 and be connected to the cooling pipe unit 130.

The coolant inflow and outflow pipe 300 may be provided as a pair for supplying and discharging the coolant.

Hereinafter, the pair of coolant inflow and outflow pipes 300, the first sealing unit 400 and the second sealing unit 500 will be described in more detail.

Figure 3:
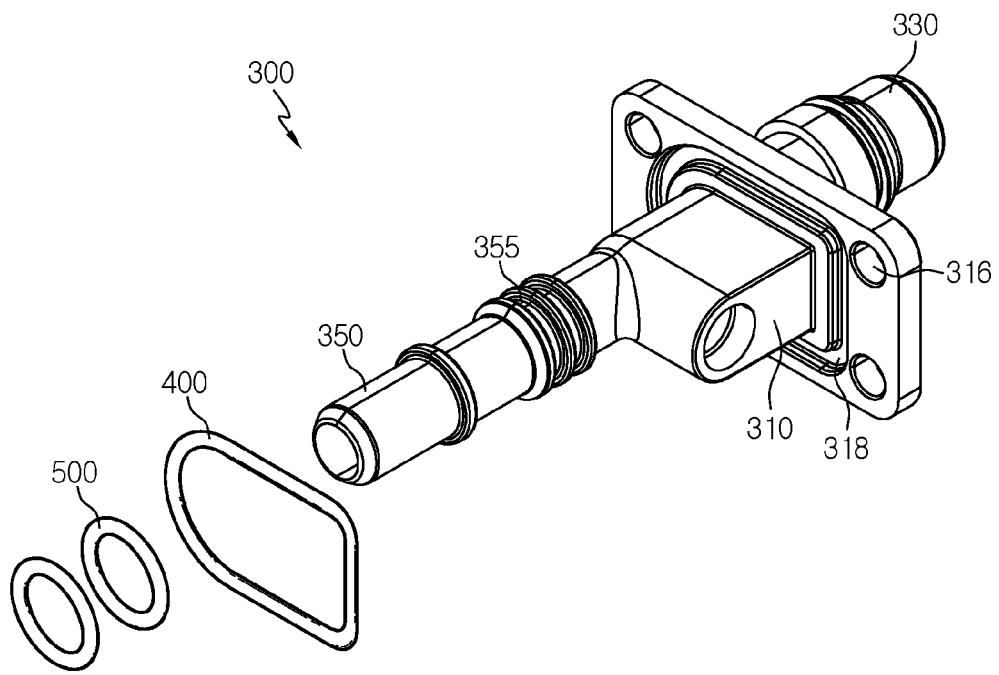
FIG. 3 is a diagram for illustrating a coolant inflow and outflow pipe of the battery pack of FIG. 2.
Figure 4:
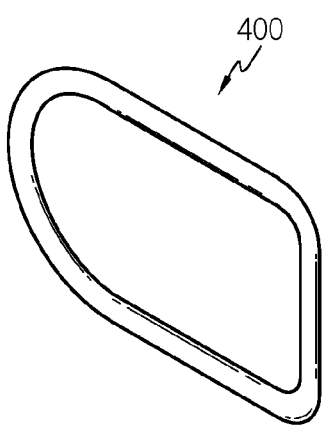
FIG. 4 is a diagram for illustrating a first sealing unit of the battery pack of FIG. 2.
Figure 5:
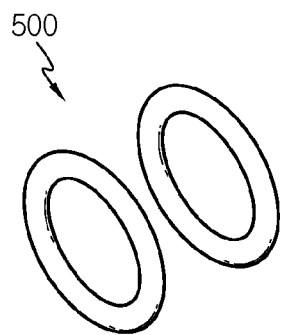
FIG. 5 is a diagram for illustrating a second sealing unit of the battery pack of FIG. 2.
Figure 6:
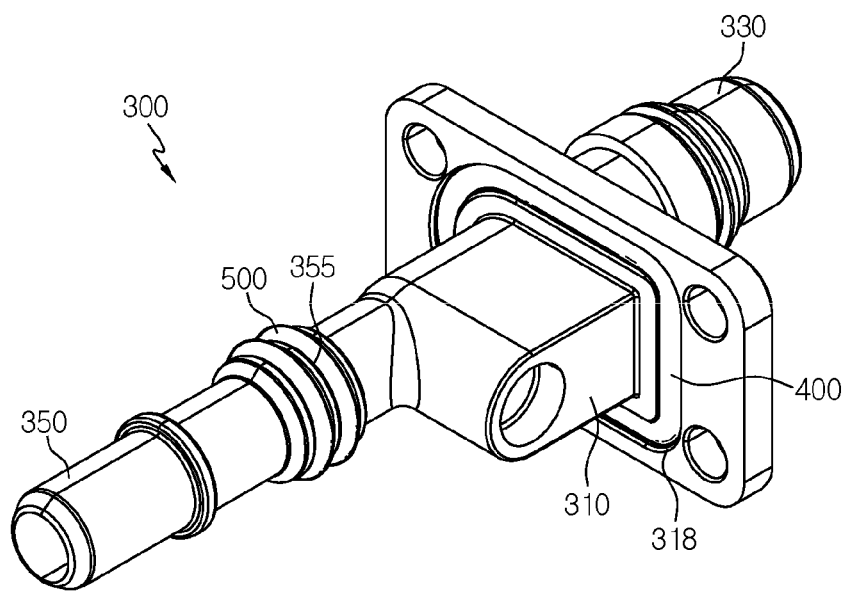
FIGS. 6 and 7 are diagrams for illustrating that the coolant inflow and outflow pipe of FIG. 2 is mounted to the first and second sealing units.
Figure 7:
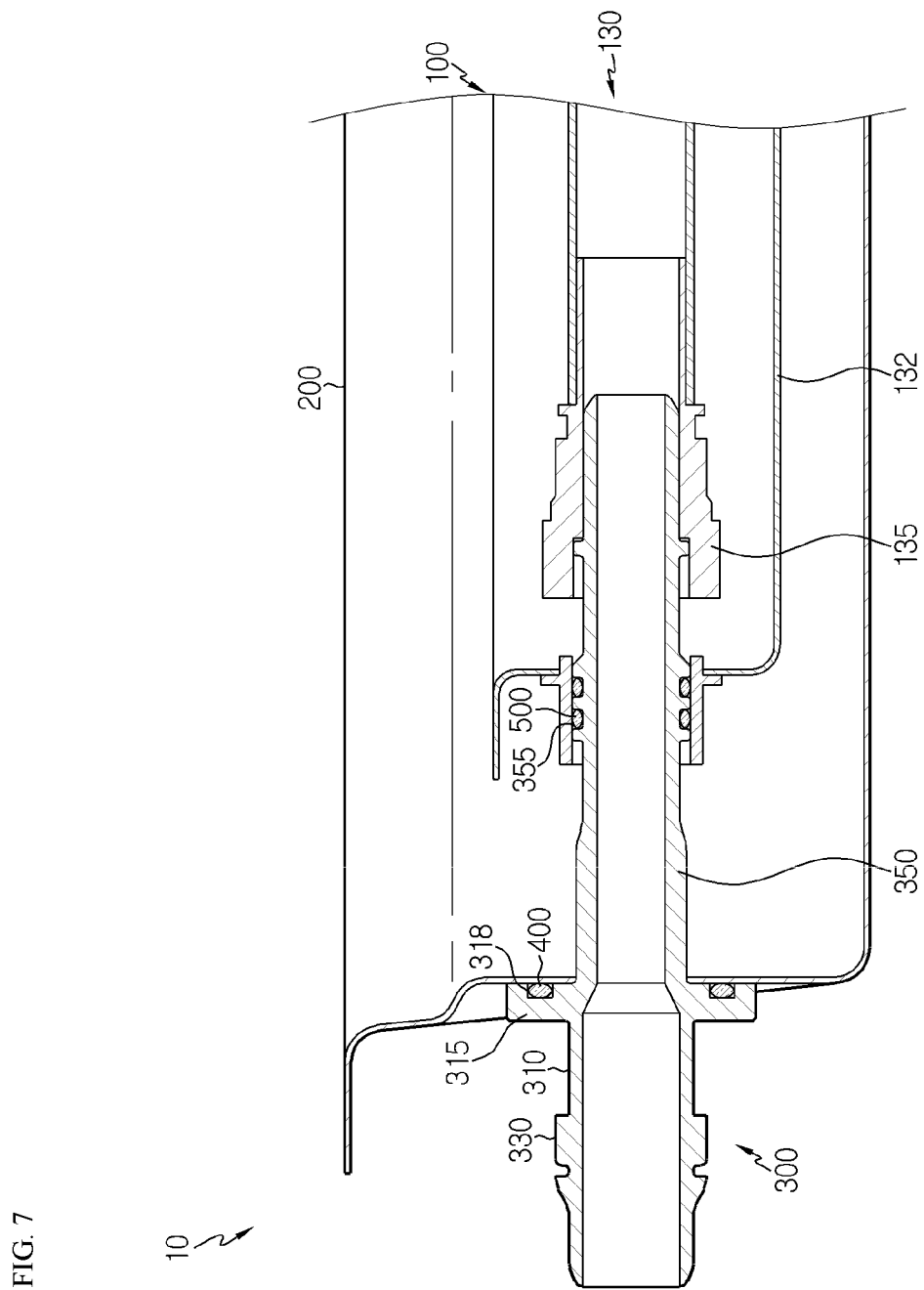

FIG. 3 is a diagram for illustrating a coolant inflow and outflow pipe of the battery pack of FIG. 2, FIG. 4 is a diagram for illustrating a first sealing unit of the battery pack of FIG. 2, FIG. 5 is a diagram for illustrating a second sealing unit of the battery pack of FIG. 2, and FIGS. 6 and 7 are diagrams for illustrating that the coolant inflow and outflow pipe of FIG. 2 is mounted to the first and second sealing units.

Referring to FIGS. 3 to 7, each coolant inflow and outflow pipe 300 may include a pipe body 310, an outer pipe 330, and an inner pipe 350.

The pipe body 310 may be mounted through the pack case 200. At least a portion of the pipe body 310 may be disposed to contact the outer surface of the pack case 200.

The pipe body 310 may include a fastening plate 315.

The fastening plate 315 is disposed at the outer side of the pack case 200, and may be fastened with the pack case 200.

The fastening plate 315 may include a pack case mounting portion 316 and a first sealing unit insert groove 318.

The pack case mounting portion 316 is for coupling with the pack case 200, and may be fastened with the pack case 316 by screw coupling or the like. To this end, the pack case mounting portion 316 may be provided as one or more screw holes for screw coupling.

A first sealing unit 400, explained later, may be inserted and mounted in the first sealing unit insert groove 318. Accordingly, the first sealing unit insert groove 318 may be provided in a shape corresponding to the first sealing unit 400, explained later.

The outer pipe 330 protrudes from the pipe body 310 to the outside of the pack case 200, and may be connected to the external cooling unit C. Specifically, the outer pipe 330 may be provided to protrude out of the pack case 200 from the fastening plate 315 by a predetermined length.

The inner pipe 350 may be disposed to be spaced apart from the outer pipe 330 by a predetermined distance, protrude into the pack case 200 from the pipe body 310, and be connected to the cooling pipe unit 130.

Specifically, at least a portion of the inner pipe 350 may be connected to the connection pipe 135 through the pipe housing 132 of the cooling pipe unit 130.

The first sealing unit 400 is for implementing a watertight structure and may be provided as an O-ring member. Specifically, the first sealing unit 400 may be provided as a planar O-ring member of an approximately rectangular planar shape.

The first sealing unit 400 provided as such a planar O-ring member is inserted into the first sealing unit insert groove 318 of the fastening plate 315, and then may maintain the sealing by a surface pressure generated by compression caused by screw coupling between the fastening plate 315 and the pack case 200.

The first sealing unit 400 may be disposed between the coolant inflow and outflow pipe 300 and the pack case 200. Specifically, the first sealing unit 400 may be disposed between the pipe body 310 and the pack case 200. More specifically, the first sealing unit 400 may be disposed to contact the outer surface of the pack case 200, and may be disposed between the fastening plate 315 and the pack case 200. For this, the first sealing unit 400 may be inserted and mounted in the first sealing unit insert groove 318.

The second sealing unit 500 is for implementing a watertight structure, and may be provided as an O-ring member. Specifically, the second sealing unit 500 may be provided as an axial O-ring member in a circular axial shape.

The second sealing unit 500 provided as the axial O-ring member may be formed to have a thickness greater than the difference between the outer diameter of the inner pipe 350 and the inner diameter of the pipe housing 132. Accordingly, the second sealing unit 500 may maintain the sealing by the surface pressure generated by compression when the inner pipe 350 and the pipe housing 132 are connected.

The second sealing unit 500 is disposed to be spaced apart from the first sealing unit 400 by a predetermined distance, and may be disposed between the coolant inflow and outflow pipe 300 and the cooling pipe unit 130.

Specifically, the second sealing unit 500 may be disposed between the inner pipe 350 of the coolant inflow and outflow pipe 300 and the cooling housing 132 of the cooling pipe unit 130.

At least one second sealing unit 500 or a plurality of second sealing units 500 may be provided. For this, the second sealing unit 500 may be inserted and mounted in a second sealing unit insert groove 355. Hereinafter, in this embodiment, it will be described that a plurality of second sealing units 500 are provided.

The plurality of second sealing units 500 may be disposed to be spaced apart from each other by a predetermined distance along the longitudinal direction of the inner pipe 350. Specifically, in this embodiment, the second sealing unit 500 may be provided as a pair so that the pair of second sealing units 500 are spaced apart from each other by a predetermined distance along the longitudinal direction of the inner pipe 350. In this embodiment, since the second sealing unit 500 is provided as a pair and the pair of second sealing units 500 are spaced apart from each other, the watertight structure may be more firmly implemented.

As such, in this embodiment, by means of the second sealing unit 500 and the first sealing unit 400, it is possible to implement a more robust watertight structure in both the cooling housing 132 of the cooling pipe unit 130 and the pack case 200.

Moreover, in this embodiment, by means of the two sealing structures of the first sealing unit 400 and the second sealing unit 500, even if any one sealing structure has a problem, the other sealing structure may compensate for it.

In addition, in this embodiment, since the first sealing unit 400 and the second sealing unit 500 are structurally independent from each other as a planar structure and an axial structure, respectively, they may not affect each other in relation to sealing.

Figure 8:
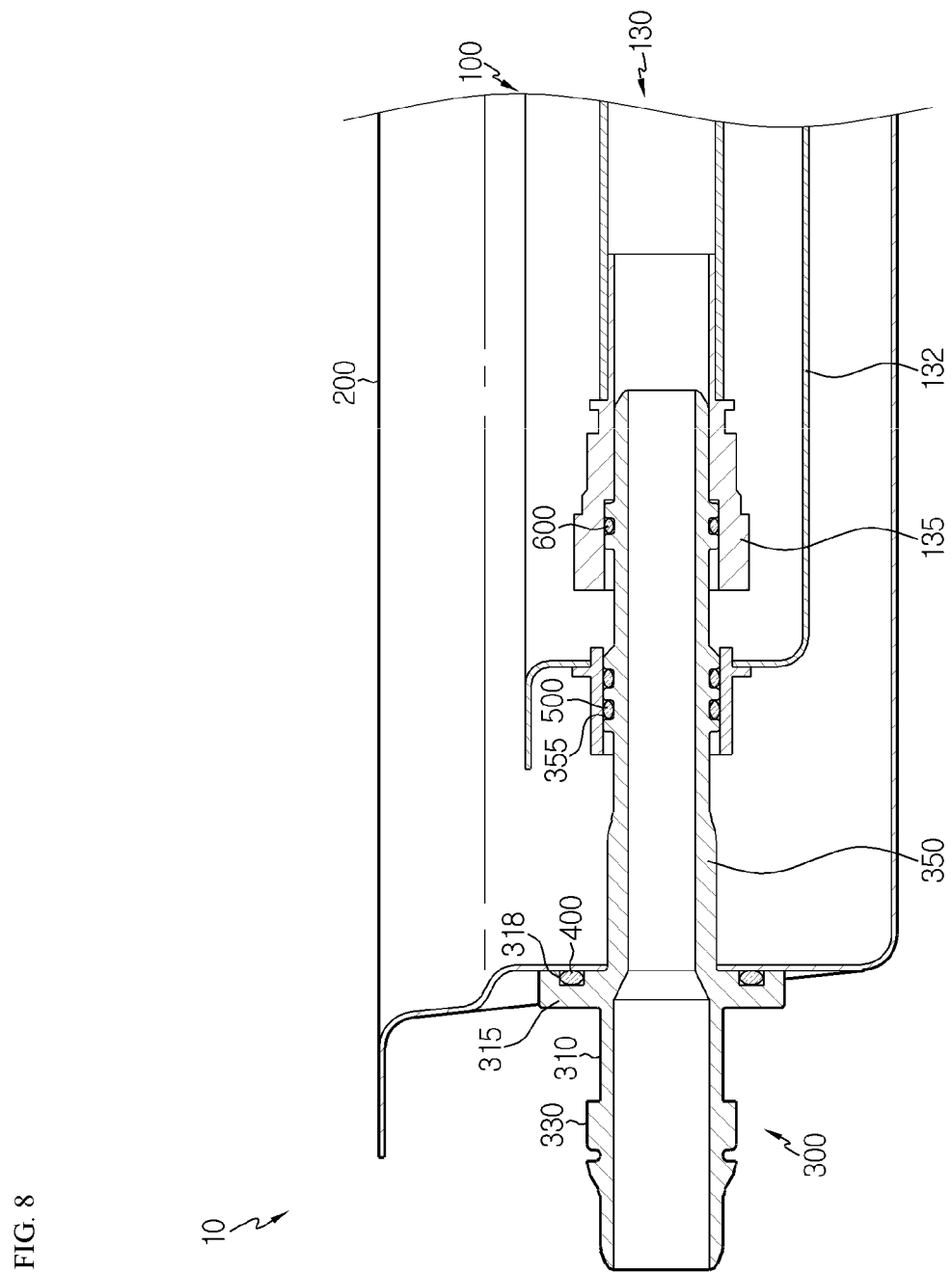
FIG. 8 is a diagram for illustrating a coolant inflow and outflow pipe according to another embodiment of the present disclosure.

FIG. 8 is a diagram for illustrating a coolant inflow and outflow pipe according to another embodiment of the present disclosure.

Referring to FIG. 8, the coolant inflow and outflow pipe 300 may further include a third sealing unit 600.

The third sealing unit 600 is to further improve the implementation of the watertight structure, and may be provided as an O-ring member. In this embodiment, by means of the third sealing unit 600, the watertight structure may be implemented even inside the pipe housing 132 of the cooling pipe unit 130, and thus the watertight structure may be made more robust.

Figure 9:
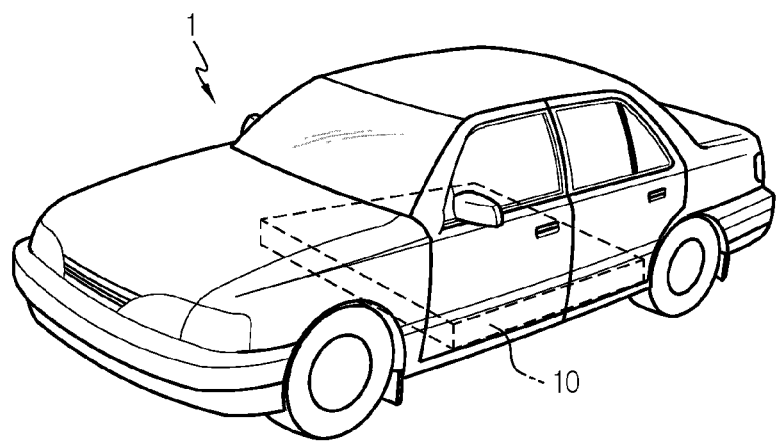
FIG. 9 is a diagram for illustrating a vehicle according to an embodiment of the present disclosure.

FIG. 9 is a diagram for illustrating a vehicle according to an embodiment of the present disclosure.

Referring to FIG. 9, the vehicle 1 according to this embodiment may include at least one battery pack 10 of the former embodiment. The battery pack 10 provided to the vehicle 1 may be provided as a fuel source for the vehicle. As an example, the battery pack 10 may also be provided to an electric vehicle, a hybrid electric vehicle, and other types of vehicles 1 in which the battery pack 10 may be used as a fuel source.

According to various embodiments as described above, it is possible to provide a battery pack 10, which may implement a tighter watertight structure in a water-cooled battery pack 10, and a vehicle 1 including the battery pack 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack, comprising:
   at least one battery module including at least one battery cell and having a cooling pipe unit including a coolant flow path for cooling the at least one battery cell;
   a pack case configured to accommodate the at least one battery module;
   a coolant inflow and outflow pipe mounted through the pack case and connected to the cooling pipe unit to supply a coolant to the coolant flow path from an outside of the pack case and to discharge the coolant from the coolant flow path to the outside of the pack case;

a first sealing unit between the coolant inflow and outflow pipe and the pack case; and a second sealing unit spaced apart from the first sealing unit by a predetermined distance and between the coolant inflow and outflow pipe and the cooling pipe unit, wherein the cooling pipe unit further includes a pipe housing disposed adjacent to the at least one battery cell, and wherein the second sealing unit is disposed at the pipe housing.

2. The battery pack according to claim 1, wherein the coolant inflow and outflow pipe includes:

a pipe body provided through the pack case and contacting an outer surface of the pack case;

an outer pipe configured to protrude out of the pack case from the pipe body and connected to an external cooling unit; and an inner pipe spaced apart from the outer pipe by a predetermined distance, configured to protrude into the pack case from the pipe body, and connected to the cooling pipe unit.

3. The battery pack according to claim 2, wherein the first sealing unit is between the pipe body and the pack case.

4. The battery pack according to claim 2, wherein the first sealing unit contacts the outer surface of the pack case.

5. The battery pack according to claim 2, wherein the pipe body includes a fastening plate at an outer side of the pack case and fastened with the pack case, and wherein the first sealing unit is between the fastening plate and the pack case.

6. The battery pack according to claim 5, wherein the fastening plate has a first sealing unit insert groove into which the first sealing unit is inserted.

7. The battery pack according to claim 2, wherein the second sealing unit is provided in plural, and the plurality of second sealing units are spaced apart from each other by a predetermined distance along a longitudinal direction of the inner pipe.

8. The battery pack according to claim 1, wherein the first sealing unit includes a planar O-ring member.

9. The battery pack according to claim 1, wherein the second sealing unit includes an axial O-ring member.

10. A vehicle, comprising at least one battery pack according to claim 1.

11. The battery pack according to claim 1, wherein the second sealing unit is disposed outside of the pipe housing.

12. The battery pack according to claim 2, wherein the inner pipe exposed within the pack case between the first sealing unit and the second sealing unit.

\* \* \* \* \*